US006377540B1

(12) United States Patent
Hogberg et al.

(10) Patent No.: US 6,377,540 B1
(45) Date of Patent: Apr. 23, 2002

(54) METHOD AND APPARATUS FOR MANAGING RESOURCE ALLOCATION CONFLICTS IN A COMMUNICATIONS SYSTEMS

(75) Inventors: Shawn Wesley Hogberg, Chandler, AZ (US); Gerald Joseph Davieau, Eldersburg, MD (US); Victor Hawes Cutler, Jr., Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/126,651

(22) Filed: Jul. 31, 1998

(51) Int. Cl.[7] ............................................. G01R 31/08
(52) U.S. Cl. ...................... 370/216; 370/321; 370/310; 370/344; 705/205
(58) Field of Search ................. 370/216, 310, 370/319, 320, 321, 322, 445, 337, 345, 347, 344, 348; 455/434, 443, 427; 707/205

(56) References Cited

U.S. PATENT DOCUMENTS

| | | | | | |
|---|---|---|---|---|---|
| 4,766,591 A | * | 8/1988 | Huang | ......................... | 370/445 |
| 5,574,969 A | | 11/1996 | Olds et al. | ................. | 455/12.1 |
| 5,732,351 A | * | 3/1998 | Olds | ........................... | 455/436 |
| 5,806,074 A | * | 9/1998 | Souder | ....................... | 707/207 |
| 6,157,840 A | * | 12/2000 | Hogberg | ..................... | 455/452 |
| 6,161,150 A | * | 12/2000 | Sudhakaran | ................... | 710/8 |

* cited by examiner

*Primary Examiner*—Douglas Olms
*Assistant Examiner*—Ricardo M. Pizarro
(74) *Attorney, Agent, or Firm*—James E. Klekotka; Frank J. Bogacz (57) ABSTRACT

A conflict resolution center (130 FIG. 1) is used to manage and resolve resource allocation conflicts in communications system (100) including a number of semi-autonomous communications nodes (SACNs). SACN (110) operates semi-autonomously because SACNs cannot independently allocate and de-allocate resources but rather operate within the confines of at least one local neighborhood. SACNs (110) allocate and de-allocate resources locally based on local neighborhood information. A conflict occurs when at least two SACNs try to allocate the same resource. Conflict resolution center (130) resolves conflicts using a number of different procedures. When a conflict can be resolved, conflict resolution center (130) provides resource reallocation data to at least one SACN (110). When a conflict cannot be resolved, conflict resolution center (130) notifies a system administrator.

16 Claims, 4 Drawing Sheets

METHOD AND APPARATUS FOR MANAGING RESOURCE ALLOCATION CONFLICTS IN A COMMUNICATIONS SYSTEMS

FIELD OF THE INVENTION

This invention relates generally to communications systems and, more particularly, to a method and apparatus for managing resource allocation conflicts in a communications system.

BACKGROUND OF THE INVENTION

Typically, in a communications system, a number of communications nodes are used. A communications system allows a communications node at one location to communicate with another communications node at another location. Nodes can be classified as source nodes, destination nodes, and interconnection nodes. Nodes generally have some control over the operations they perform.

In an autonomous system, nodes operate independently. In a semi-autonomous system, nodes operate independently within a restricted environment, which is established using a set of operational rules. In a semi-autonomous system, conflicts can develop as nodes compete for a limited amount of resources.

For example, when satellites are allowed to allocate channel resources in a semi-autonomous satellite communications system, channel resource allocation conflicts can occur. In this semi-autonomous satellite communications system, each satellite operates in a restricted environment, such as a local neighborhood. In a local neighborhood, channel resource allocation rules have been established. Because the satellites are operating as semi-autonomous nodes, conflicts can occur when two satellites attempt to allocate the same channel resource during over-lapping time periods.

What are needed are a method and apparatus for monitoring the resource allocation process for a number of semi-autonomous communications nodes in a communications system. Further, there is a need for a method and apparatus for providing conflict detection and resolution for a number of semi-autonomous communications nodes that are semi-autonomously performing resource allocation processes in a communications system.

BRIEF DESCRIPTION OF THE DRAWINGS

A more complete understanding of the invention can be derived by referring to the detailed description and claims when considered in connection with the figures, wherein like reference numbers refer to similar items throughout the figures, and:

DETAILED DESCRIPTION OF A PREFERRED EMBODIMENT

The method and apparatus of the present invention, among other things, monitors the resource allocation process for a number of semi-autonomous communications nodes in a communications system. Further, the method and apparatus of the present invention provide conflict detection and resolution for a number of semi-autonomous communications nodes that are semi-autonomously performing resource allocation processes in a communications system.

The present invention is applicable to terrestrial-based and space-based communication systems. Systems may include satellites having low-earth, medium-earth and geo-synchronous orbits.

In a communications system, resources, such as communications channels, are dynamically allocated and de-allocated in real-time based on actual demand using a regionalized resource allocation and de-allocation scheme. Typically, communications nodes perform resource allocations and de-allocations processes semi-autonomously in a communications system. Resource allocations and de-allocations, among other things, can be managed using interlocking regions, such as local neighborhoods.

In a preferred embodiment, resource allocation and de-allocation monitoring is managed using local neighborhoods and at least one conflict resolution center. In addition, conflict detection and resolution are managed using local neighborhoods and at least one conflict resolution center.

Figure 1:
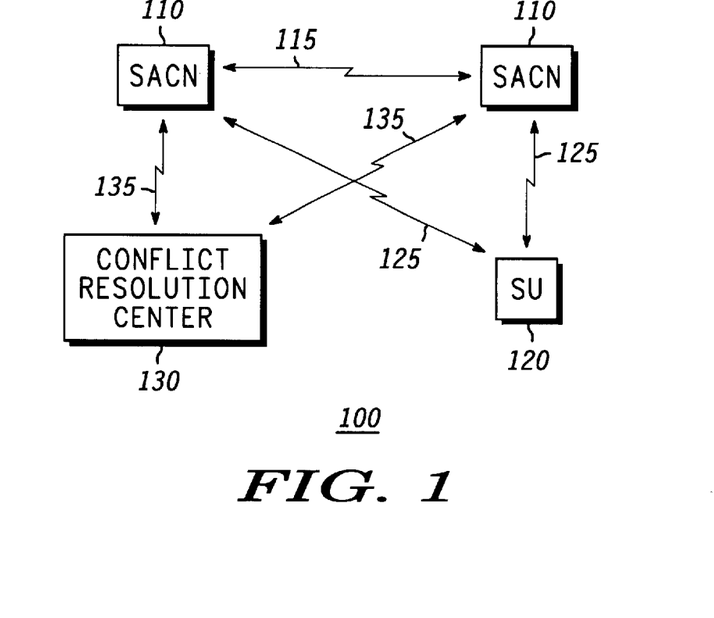
FIG. 1 shows a general view of a communications system in accordance with a preferred embodiment of the invention.

FIG. 1 shows a general view of a communications system in accordance with a preferred embodiment of the invention. Communications system 100 comprises a plurality of semi-autonomous communications nodes (SACNs) 110, at least one subscriber unit (SU) 120, and at least one conflict resolution center 130. Desirably, SACNs are satellites that cooperate with other satellites in a local neighborhood when allocating resources.

For clarity, FIG. 1 illustrates only two SACNs 110, a single SU 120, and a single conflict resolution center 130. This is done to facilitate the explanation of the invention. Different numbers of SACNs, SUs, and ground stations, such as illustrated by conflict resolution center 130, can be used. While the present invention is advantageously employed when a large number of SACNs are being used, it is also applicable with as few as two SACNs.

In a preferred embodiment, SACNs 110 communicate with other SACNs 110 using crosslinks 115. In FIG. 1, a single crosslink is illustrated. This is done to facilitate the explanation of the invention. In a preferred embodiment, a number of SACNs and crosslinks are used. In alternate embodiments, various numbers of SACNs and crosslinks can be used.

Generally, communications system 100 can be viewed as a network of nodes. As illustrated in FIG. 1, SACNs can be viewed as interconnection nodes and resources are allocated and de-allocated as the level of interconnection changes. SACNs are or can be in data communication with other SACNs, SUs, and other communications devices through communication links, such as those illustrated by links 115, 125, and 135. In addition, SACNs 110 can be coupled to other satellite and/or terrestrial networks through other links (not shown).

In a preferred embodiment, SACN 110 communicates with other SACNs 110 through crosslinks 115. Crosslinks are used to interconnect SACNs into a network of nodes within communications system 100. Resources are allocated and de-allocated when crosslinks are established, discontinued, and changed. Crosslinks 115, among other things, provide a network for carrying resource allocation information and control data anywhere within system 100. In addition, crosslinks 115 are used to establish local neighborhoods by interconnecting groups of SACNs.

SUs 120 can be located at various points on the surface of earth or in the atmosphere above earth. Communications system 100 can accommodate any number of SUs 120. SUs 120 are preferably SUs capable of transmitting and/or receiving data from SACNs 110. By way of example, SUs 120 can comprise computers, video devices, or other communications devices.

Multiple channels can be supported between a SACN and a SU using different frequencies, different codes, and/or modulation formats. In a preferred embodiment, multiple channels between a SACN and a SU are accomplished using different operating frequencies. SACNs operate within at least one local neighborhood using dynamic, real-time processes to adaptively allocate resources, such as assigning channels to subscriber units.

In a preferred embodiment, conflict resolution center 130 communicates with SACNs 110 that are within its field of view through links 135, which can be RF and/or optical links. Link 135 can be established between any SACN 110 and conflict resolution center 130 that are within communication range of each other.

In a preferred embodiment, links 115, 125, and 135 encompass a limited portion of the electromagnetic spectrum that is divided into channels. Links 115, 125, and 135 can encompass any suitable channel diversity scheme such as Frequency Division Multiple Access (FDMA) and/or Time Division Multiple Access (TDMA) and/or Code Division Multiple Access (CDMA) communications channels or combinations thereof. In alternate embodiments, links 115, 125, and 135 can be optical links and combinations of optical and RF links.

In FIG. 1, links 115, 125, and 135 are illustrated as bi-directional links. This is not required for the invention. In alternate embodiments, links 115,125, and 135 can be uni-directional links.

Desirably, SACNs that are close to each other make up a local neighborhood. In a preferred embodiment, local neighborhoods are dynamically changing. For example, the number of SACNs comprising a local neighborhood can change as SACNs 110 move relative to each other. SACN 110 establishes a local neighborhood and notifies SACNs within its local neighborhood whenever it allocates and de-allocates a resource. SACN also notifies at least one conflict resolution center whenever it allocates and de-allocated a resource.

In a preferred embodiment, resource allocations within each local neighborhood are maintained locally by each SACN. For example, a list of available resources can be stored by each SACN. In addition, resource allocations within each local neighborhood are also monitored and managed by at least one conflict resolution center.

In the preferred embodiment, resources are allocated based on the resource allocations and de-allocations made by other SACNs in its local neighborhood. Preferably, a resource allocation by one SACN does not conflict with resources allocated by other SACNs within its local region.

Knowledge of resource allocations and de-allocations within a SACN's local neighborhood minimizes but does not always prevent resource allocation conflicts from occurring. Whenever a resource is allocated or de-allocated, a SACN sends a message to SACNs in its local region and to at least one conflict resolution center. When a resource is allocated, it is removed from the pool of available resources for the SACNs within this local neighborhood. For example, a list can be used to identify the pool of available resources.

Within the local neighborhood, the pool of available resources becomes limited because SACNs within the local neighborhood can only allocate available (non-allocated) resources. Thus, a limited pool of available resources results for each SACN within a local neighborhood and the likelihood of a conflict increases.

Conflicts can occur for a number of reasons. For example, SACNs can be making similar decisions in the same time frame and allocating the same resource. Allocation data and reallocation data does not move through the system instantaneous. In addition, problems can occur which cause resources to be unavailable or degraded for different lengths of time, and these problems can cause conflicts to intermittently occur. Conflict resolution center 130 is used to manage and resolve resource allocation conflicts in communications system 100. When SACNs 110 operate semi-autonomously, SACNs cannot independently allocate resources but rather a SACN must operate within the confines of at least one local neighborhood.

That is, SACN 110 has knowledge of the resources already allocated by other members of the local neighborhoods in which it is currently operating. SACN 110 allocates and de-allocates resources locally based on local neighborhood information.

A conflict occurs when at least two SACNs try to allocate the same resource. Conflict resolution center 130 resolves conflicts using a number of different procedures. When a conflict can be resolved, conflict resolution center 130 provides resource reallocation data to at least one SACN 110. When a conflict cannot be resolved, conflict resolution center 130 notifies a system administrator.

Figure 2:
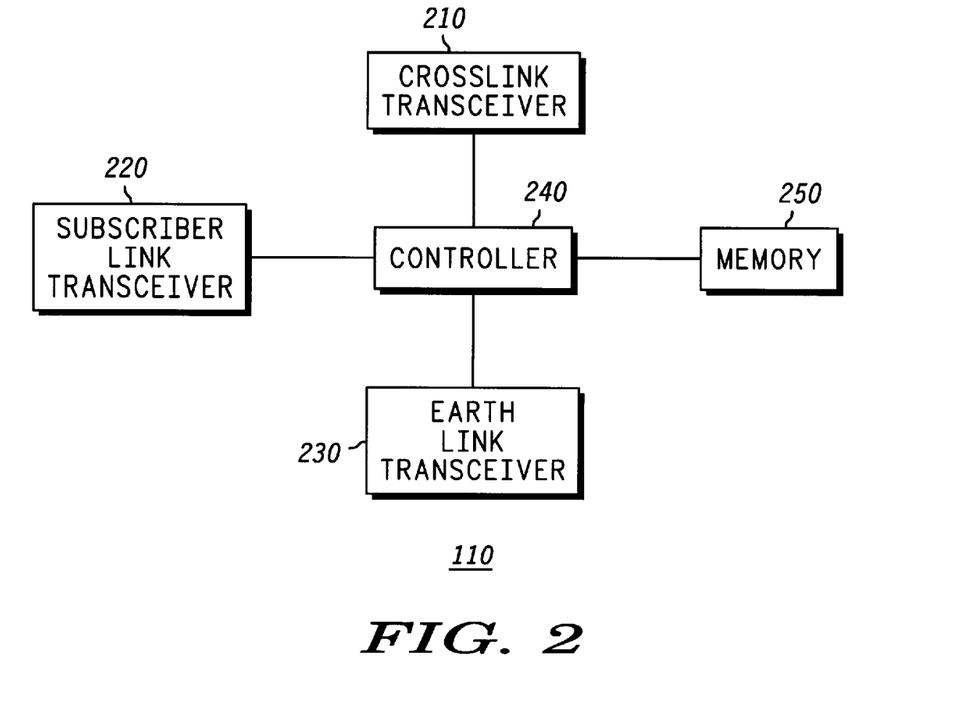
FIG. 2 illustrates a simplified block diagram of a semi-autonomous communications node (SACN) in accordance with a preferred embodiment of the invention.

FIG. 2 illustrates a simplified block diagram of a semi-autonomous communications node (SACN) in accordance with a preferred embodiment of the invention. Preferably, many or all SACNs 110 (FIG. 1) within system 100 (FIG. 1) include equipment as illustrated by the simplified block diagram of FIG. 2. SACN 110 comprises crosslink transceiver 210, subscriber link transceiver 220, earth link transceiver 230, controller 240, and memory 250.

Crosslink transceiver 210 and associated antenna (not shown) support crosslinks to other SACNs 110 (FIG. 1). In a preferred embodiment, each SACN supports at least one crosslink for communicating with at least one other SACN in a local neighborhood. In addition, a local neighborhood can comprise SACNs that are coupled using long crosslinks. For example, in a constellation in which seams are present, direct crosslinks between neighboring SACNs may not be possible.

In a preferred embodiment, a FDMA/TDMA methodology is used to establish crosslinks. Crosslink channels are one of the resources that are cooperatively allocated within a local neighborhood and are monitored by conflict resolution center 130. In alternate embodiments, coding can be used to allocate and control crosslink channels.

Earth link transceiver 230 and associated antenna (not shown) support links to terrestrial-based communications devices, such as conflict resolution center 130 (FIG. 1). In a preferred embodiment, each SACN supports at least one earth link for communicating with at least one conflict resolution center 130.

In addition, terrestrial-based communications devices can included, among other things, gateways and control centers.

In a preferred embodiment, earth links can be used to overcome some problems associated with crosslinks.

In a preferred embodiment, a FDMA/TDMA methodology is used to provide diversity on the earth links. Earth link channels are one of the resources that are cooperatively allocated within a local neighborhood and are monitored by conflict resolution center 130. In alternate embodiments, coding can be used to allocate and control earth link channels.

Subscriber link transceiver 220 and associated antenna (not shown) support links to terrestrial-based subscriber units, such as SU 120 (FIG. 1). In a preferred embodiment, each SACN supports a number of subscriber links for communicating with a number of SUs. In addition, subscriber links can be established with other terrestrial-based terminals, such as paging devices.

In a preferred embodiment, SACN 110 (FIG. 1) communicates with SUs 120 which are within one of its beams through links, such as illustrated by links 125 in FIG. 1. Subscriber links 125 can be established between any SACN 110 and SU that are within communication range of each other.

In a preferred embodiment, a FDMA/TDMA methodology is used to provide diversity on subscriber links. Subscriber link channels are also one of the resources that are cooperatively allocated within a local neighborhood and are monitored by conflict resolution center 130. In alternate embodiments, coding can be used to allocate and control subscriber link channels.

Desirably, each SACN 110 can simultaneously support a number of crosslinks, a number of earth links, and many subscriber links.

Controller 240 is coupled to crosslink transceiver 210, subscriber link transceiver 220, and earth link transceiver 230, and memory 250. Controller 240 could be implemented using one or more processors. Controller 240 uses knowledge of system time, among other things, to determine when to allocate and de-allocate resources. For example, knowledge of system time allows SACNs in a local neighborhood to determine when resources should be allocated and de-allocated as crosslinks, earth links and subscriber links are established, discontinued, and handed-off.

In a preferred embodiment, controller 240 controls the formation of crosslinks 115 (FIG. 1) by, among other things, determining crosslink resources that are available, determining crosslink resources that are required, determining how long crosslink resources are required. In addition, controller 240 sends control information to crosslink transceiver 210 so that crosslink resources can be allocated and de-allocated at the appropriate times.

In a preferred embodiment, controller 240 controls the formation of subscriber links 125 (FIG. 1) by, among other things, determining subscriber link resources that are available, determining subscriber link resources that are required, and determining how long subscriber link resources are required. In addition, controller 240 sends control information to subscriber link transceiver so that subscriber links can be handed-off at the appropriate times. In addition, controller 240 sends control information to subscriber link transceiver 220 so that subscriber link resources can be allocated and de-allocated at the appropriate times.

In a preferred embodiment, controller 240 controls the formation of earth links 135 (FIG. 1) by, among other things, determining earth link resources that are available, determining earth link resources that are required, and determining how long earth link resources are required. In addition, controller 240 sends control information to earth link transceiver 230 so that earth link resources can be allocated and de-allocated at the appropriate times.

Memory 250 stores data that serve as instructions to controller 240 and that, when executed by controller 240, cause SACN 110 to carry out particular aspects of the method of the invention, as will be discussed in detail below. In addition, memory 250 desirably includes variables, tables, lists, and databases that are manipulated during the operation of SACN 110.

In a preferred embodiment, memory 250 is used to store data concerning the allocation of resources within a particular SACN and within the local neighborhood with which the SACN is associated. For example, when a SACN decides to use a particular subscriber link channel this information is stored in this SACN, and it is also sent to and stored in other neighboring SACNs.

SACN 110 can receive data packets via any one of transceivers 210, 220, and 230. After receipt of a data packet, controller 240 determines the data packet destination and determines how to route the packet. In a preferred embodiment, the routing decision depends on routing tables stored in memory 250 and/or on the data packet type.

In a preferred embodiment, routing tables are determined using, among other things, local neighborhood information and can be reconfigured using information from a conflict resolution center. For example, multi-layer routing tables can be used, and the layering can be changed using information from a conflict resolution center. In alternate embodiment, SACNs can reconfigure their routing table and can send routing table information to at least one conflict resolution center.

For clarity and ease of understanding, FIG. 2 illustrates one crosslink transceiver 210, one subscriber link transceiver 220, one earth link transceiver 230, one controller 240, and one memory 250. In alternate embodiments, any number of these components could be used.

Figure 3:
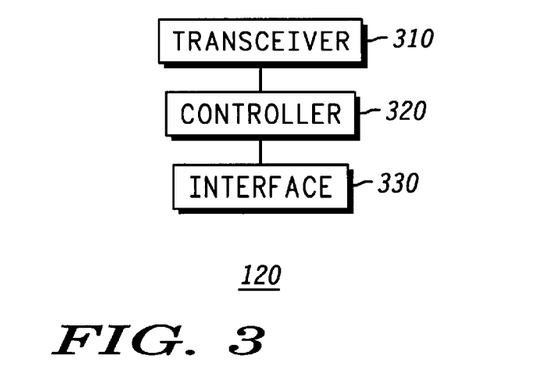
FIG. 3 illustrates a block diagram of a conflict resolution center in accordance with a preferred embodiment of the invention.

FIG. 3 illustrates a block diagram of a conflict resolution center in accordance with a preferred embodiment of the invention. Conflict resolution center 130 (FIG. 1) is used, among other things, to resolve resource allocation conflicts that occur when semi-autonomous communications nodes are allowed to make resource allocation decisions based on local neighborhood information.

In a preferred embodiment, conflict resolution center 130 includes earth link transceiver 310, controller 320, and at least one interface 330. Earth link transceiver 310 is used to establish link 135 (FIG. 1). Earth link transceiver 310 is used to send and receive data to and from SACNs 110 (FIG. 1). Received data comprises, for example, resource allocation data that enables conflict resolution center to monitor the state of the SACN and detect resource allocation conflicts. Conflict resolution center 130 also sends allocation data to SACNs via earth link transceiver 310.

In a preferred embodiment, controller 320 controls the formation of the earth links by determining link setup times when each SACN will be in communication range, calculating pointing angles of earth link antennas, and sending control information to SACNs so that earth links can be established at appropriate times. In alternate embodiments, some or all of these calculations and control functions can be performed by multiple conflict resolution centers rather than by a single conflict resolution center.

In a preferred embodiment, controller 320 performs procedures for monitoring resource allocations, for detecting resource allocation conflicts, and for resolving conflicts as discussed in detail below. In addition, controller 320 stores data that serve as instructions for performing these procedures. Also, controller 320 desirably stores variables, tables, lists, and databases that are manipulated during the operation of conflict resolution center 130.

Interface 330 is used, among other things, to connect to another network. For example, interface 330 is used to connect conflict resolution centers to each other when multiple centers are used within a system. In addition, interface 330 is used to send information to a system administrator. Interface 330 is also used to receive information and instructions from a system administrator.

Figure 4:
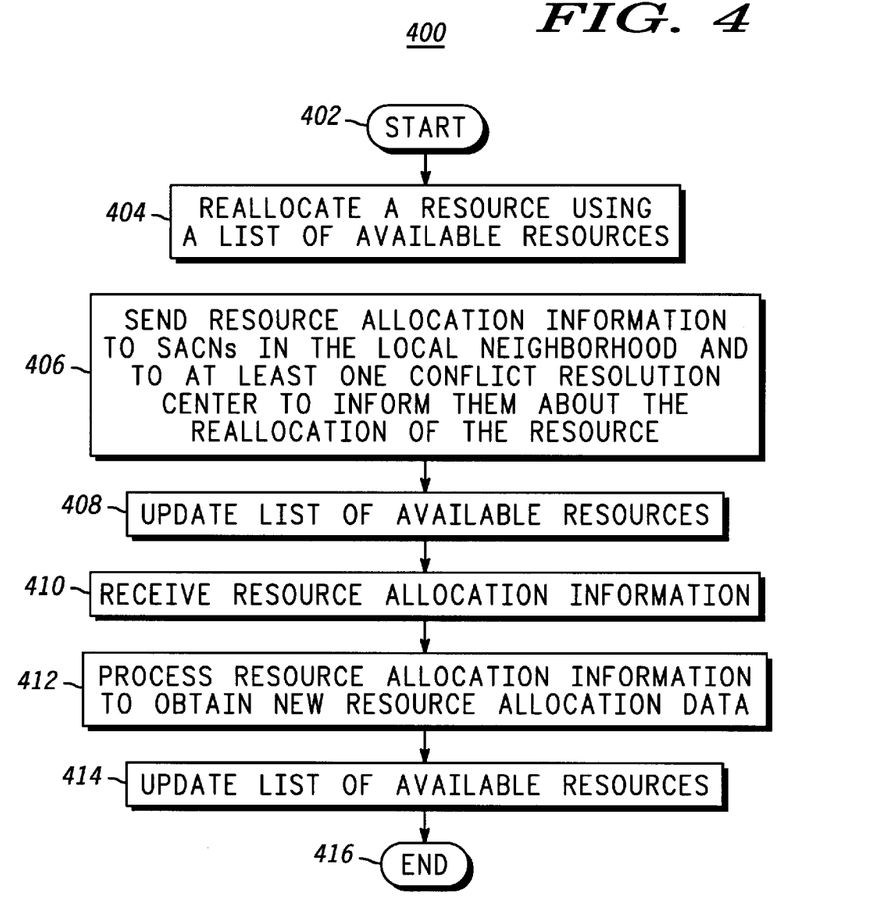
FIG. 4 illustrates a flow diagram of a method for operating a SACN in accordance with a preferred embodiment of the invention.

FIG. 4 illustrates a flow diagram of a method for operating a SACN in accordance with a preferred embodiment of the invention. Procedure 400 begins in step 402.

In step 404, a SACN allocates a first resource using a first list of available resources. The first list is established using first local neighborhood data. SACNs can be primary or secondary members of a local neighborhood. Each local neighborhood has one primary member and at least one secondary member. Each SACN is the primary member in its own local neighborhood.

In step 406, the SACN informs at least one other SACN when said first resource has been allocated. In a preferred embodiment, the SACN informs all members of its local neighborhood and at least one conflict resolution center when it allocates a resource. In addition, the SACN informs all members of its local neighborhood and at least one conflict resolution center when it deallocates a resource.

In step 408, the SACN updates the first list of available resources. In a preferred embodiment, the SACN updates its list of available resources after allocating or de-allocating a resource. For example, the list represents a pool of available resources.

In step 410, a SACN receives resource allocation information. In a preferred embodiment, a conflict resolution center sends resource allocation information to at least one SACN after performing a conflict resolution procedure. In addition, resource allocation information is obtained from other SACNs within a local neighborhood.

In step 412, the SACN processes the resource allocation information to obtain, among other things, new resource allocation data. Some SACNs re-allocate resources based on the resource allocation information. For example, this can occur when a resource allocation made by a SACN causes a conflict. The conflict resolution center can send resource allocation information to a SACN which requires the SACN to re-allocate one of its resources.

In step 414, the SACN updates the first list of available resources using new allocation data obtained from said resource allocation information. In addition, the SACN informs the other members of its local neighborhood.

Procedure 400 ends in step 416.

Figure 5:
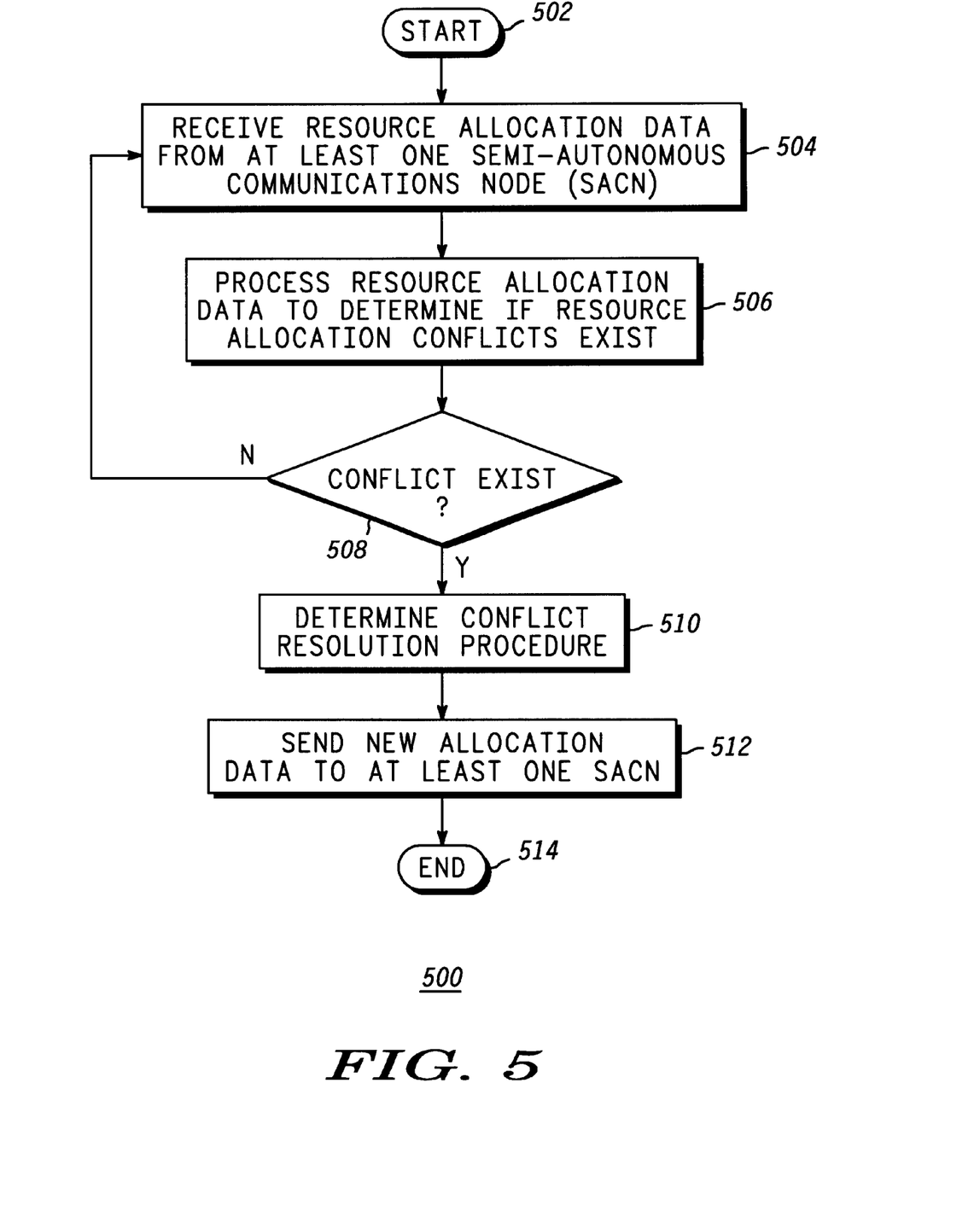
FIG. 5 illustrates a flow diagram of a method for operating a conflict resolution center in accordance with a preferred embodiment of the invention.

FIG. 5 illustrates a flow diagram of a method for operating a conflict resolution center in accordance with a preferred embodiment of the invention. Procedure 500 begins in step 502.

In step 504, a conflict resolution center receives resource allocation data from at least one semi-autonomous communications node. In a preferred embodiment, SACNs are allowed to make decisions regarding the allocation of resources on-board the communications node. These resource allocations can affect resource allocations on other SACNs within the local neighborhood and to some extent can affect the allocation of resources in the entire system.

In a preferred embodiment, a conflict resolution center is used to manage the resource allocation by identifying conflicts that occur as SACNs compete for a limited number of resources. The conflict resolution center provides conflict detection and correction for the SACNs within the system.

In step 506, a conflict resolution center processes the allocation data to determine when a conflict exists or will exist within a particular length of time.

In step 508, a query is performed to determine when a conflict exists. When a conflict exists, procedure 500 branches to step 510 and continues as shown in FIG. 5. When a conflict does not exist, procedure 500 branches back to step 504, and procedure 500 iterates as shown in FIG. 5.

In step 510, the conflict resolution center performs a conflict resolution procedure. In a preferred embodiment, the conflict resolution procedure is as shown in FIG. 6.

In step 512, the conflict resolution center sends new allocation data to at least one SACN.

Procedure 500 ends in step 514.

Figure 6:
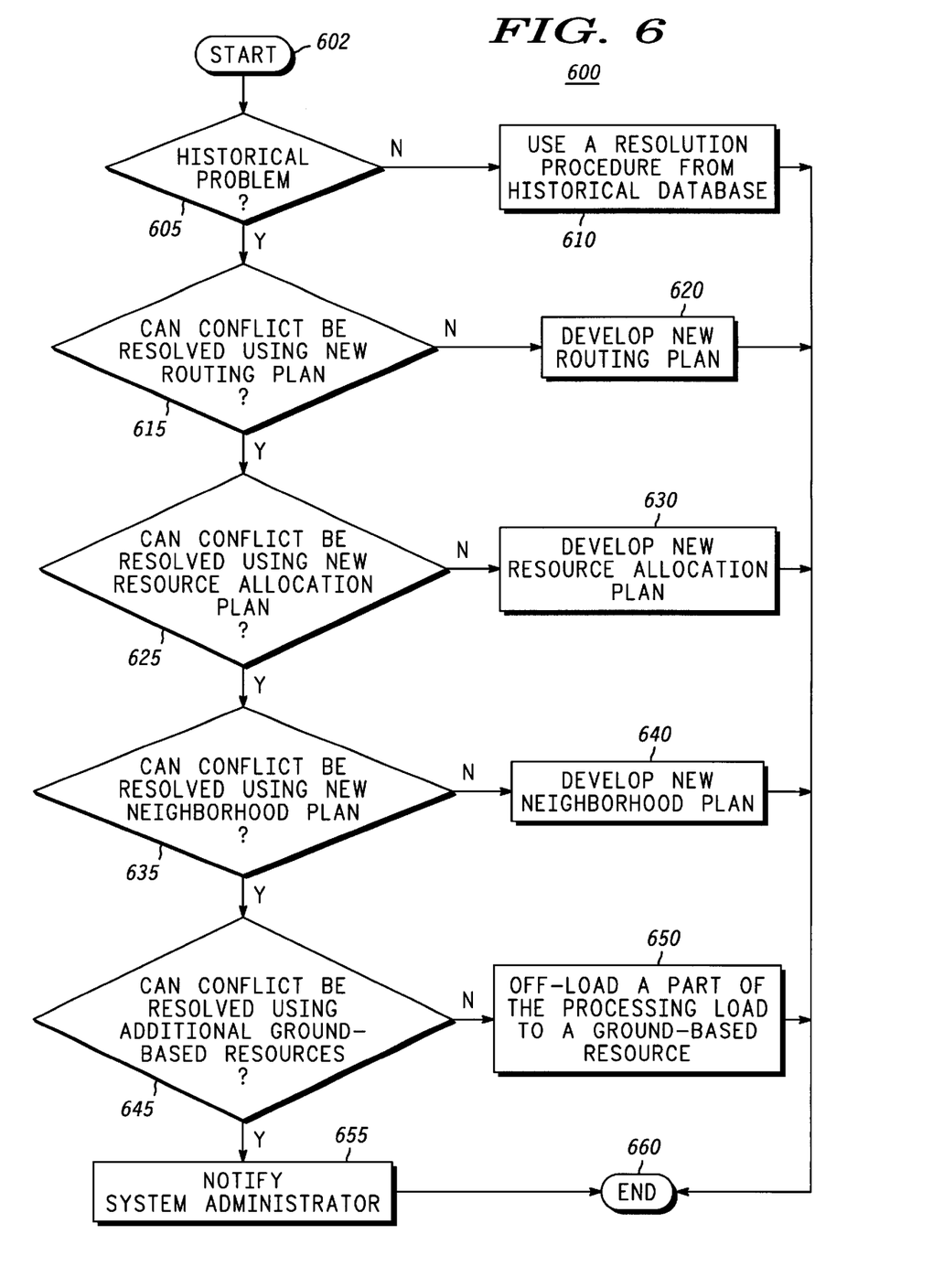
FIG. 6 illustrates a flow diagram of a procedure for resolving conflicts that is performed by a conflict resolution center in accordance with a preferred embodiment of the invention.

FIG. 6 illustrates a flow diagram of a procedure for resolving conflicts that is performed by a conflict resolution center in accordance with a preferred embodiment of the invention. Procedure 600 begins in step 602.

In step 605, a query is performed to determine if the present conflict is similar to a problem in a historical database. When the problem is similar to a problem in the historical database, then procedure 600 branches to step 610. When the problem is not similar to a problem in the historical database, then procedure 600 continues with step 615.

In step 610, the previously determined resolution procedure is used to resolve this conflict. For example, an emergency situation could develop in a particular location. The emergency situation could lead to an increase in the number of users requesting service from a particular location. In this case, SACNs would experience an increased processing load as they begin servicing the increased demand. Resource conflicts could occur due to the increased demand. These resource conflicts could have been resolved previously using a new neighborhood plan or a new frequency allocation plan.

In addition, transient problems can develop when a link between a ground station and a SACN is temporarily interrupted. This could be caused by environmental conditions or hardware malfunctions. These types of temporary system configuration changes could be stored in a historical database. Procedure 600 continues with step 660.

In step 615, a query is performed to determine if the present problem can be resolved using a new routing plan. When the problem can be resolved using a new routing plan, then procedure 600 branches to step 620. When the problem cannot be resolved using a new routing plan, then procedure 600 continues with step 625.

In step 620, a new routing plan is developed using a routing algorithm. For example, a number of SACNs could have decided to route data over a busy link thinking they were the only ones that were going to send data via this link. However, the conflict resolution center decides that this represents a problem and instructs at least one of the SACNs to use a different routing plan. The new routing plan can include ground-based resources.

In a preferred embodiment, a crosslink failure can cause a new routing plan to be developed by the conflict resolution center. The conflict resolution center instructs the SACNs to reconfigure their routing tables to overcome the problem caused by a crosslink failure. In this embodiment, the conflict is resolved using ground-based resources. That is, a ground-based resource is used to provide a temporary "bent-pipe" between the two SACNs affected by the crosslink problem. In alternate embodiments, space-based resources are used to resolve the conflict.

In a preferred embodiment, a problem with any link between a ground-based resource and a SACN can cause the conflict resolution center to develop a new routing plan. Local weather conditions can cause links to degrade and the conflict resolution center is responsible for resolving the conflicts caused by these temporary link degradations. In alternate embodiments, localized problems can be used to update a routing plan in a SACN before it flies over the problem area. Procedure 600 continues with step 660.

In step 625, a query is performed to determine if the present problem can be resolved using a new resource allocation plan. When the problem can be resolved using a new resource allocation plan, then procedure 600 branches to step 630. When the problem cannot be resolved using a new resource allocation plan, then procedure 600 continues with step 635.

In step 630, a new resource allocation plan is developed for at least one SACN. For example, a new frequency allocation plan could be developed using a frequency allocation algorithm. In this case, at least two SACNs have decided to use the same channel at the same time or during overlapping time intervals. In a preferred embodiment, a conflict resolution center determines that re-allocating resources can resolve such a condition on at least one of the SACNs. In this case, the conflict resolution center develops a new frequency allocation plan and sends re-allocation data to the SACNs. In alternate embodiments, when a channel allocation conflict is identified, the resolution center instructs at least one of the SACNs to develop a new frequency allocation plan.

In a preferred embodiment, SACNs channels are classified into three groups, and the three groups are usable, degraded, and unusable. The classifications are based on voice quality. In alternate embodiments, classifications are based on bit error rates.

In a preferred embodiment, the resource allocations associated with a hand-off are given a high priority. The conflict resolution center manages the conflicts that develop during hand-offs. For example, hand-offs can occur when a subscriber unit presently communicating on a traffic channel is switched to another antenna beam.

The conflict resolution center allows hand-offs to degraded channels for short time periods. The conflict resolution center attempts to move other users to improve the voice quality on the degraded channel.

In a preferred embodiment, a SACN has semi-autonomous control over a number of resources that comprise subscriber link channels, earth link channels, crosslink channels, number of beams, beam location, and beam size. When developing a resource allocation plan, a SACN uses, among other things, beam information from other SACNs in a local neighborhood. When beam overlap occurs, the conflict resolution center manages the allocation of resources within the overlap region when conflicts are identified. For example, in urban areas, multiple beams from multiple SACNs may be required to provide services to a large number of subscriber units. Procedure 600 continues with step 660.

In step 635, a query is performed to determine if the present problem can be resolved using a new local neighborhood plan. When the problem can be resolved using a new local neighborhood plan, then procedure 600 branches to step 640. When the problem cannot be resolved using a new local neighborhood plan, then procedure 600 continues with step 645.

In step 640, a new neighborhood plan is developed by the conflict resolution center using a local neighborhood algorithm. For example, a problem could develop with one of the SACNs such that it must be taken off-line for a certain amount of time. In this case, new neighborhood plans are developed for the SACNs affected by this particular SACN going off-line. In some cases, a single event upsets can cause a SACN to go off-line temporarily.

In alternate embodiments, a conflict resolution center can determine that a particular SACN is not functioning properly. In these embodiments, a new neighborhood plan is developed by the conflict resolution center using a local neighborhood algorithm that eliminates the troublesome SACN. Procedure 600 continues with step 660.

In step 645, a query is performed to determine if the present problem can be resolved using additional ground-based resources. When the problem can be resolved using additional ground-based resources, then procedure 600 branches to step 650. When the problem cannot be resolved using additional groundbased resources, then procedure 600 continues with step 655.

In step 650, when SACNs fly over high activity areas such as urban centers the processing load can increase significantly due to increased SU traffic. In this case, a portion of the processing load can be shifted to terrestrial-based resources. For example, when a SACN becomes overloaded, a conflict resolution center can be used to perform the processing required to perform the resource allocation procedures. The SACN allows the conflict resolution center to do the resource allocation for it during busy periods. Procedure 600 continues with step 660.

In step 655, the system administrator is notified that the current conflict in resource allocation could not be resolved. In a preferred embodiment, the SACNs involved in the conflict are identified to the system administrator and the type of resource conflict. For example, a natural disaster somewhere on the surface of the earth or in space could cause unexpected problems that could be resolved by a system administrator.

In step 660, the problem type, the affected SACNs, and affected resources are stored in a historical database. In addition, when the conflict resolution center has computed resource re-allocation data, the resource reallocation data is also stored. Procedure 600 ends in step 660.

In alternate embodiments, the system administrator is notified when a first number of similar problems are stored in the historical database. For example, system administrator notification is provided and intervention is allowed when similar problems are stored in the database three times.

In summary, a communications system has been described in which a number of SACNs allocate and de-allocate resources based on a limited knowledge of the present state of the system. The limited knowledge is defined by local neighborhood information. Because SACNs are operating with a limited knowledge base, conflicts occur when at least two SACNs try to allocate the same resource during overlapping time periods. SACNs report resource allocations and de-allocations to at least one conflict resolution center which is responsible for managing resource on a system-wide basis. Resource allocation conflicts are detected and resolved using at least one conflict resolution center.

The invention has been described above with reference to a preferred embodiment. However, those skilled in the art will recognize that changes and modifications can be made in this preferred embodiment without departing from the scope of the invention. For example, the procedures and steps identified herein can be categorized and organized differently than described herein while achieving equivalent results.

In addition, the number of resources and the type of resources that can be allocated and de-allocated by the SACNs can be changed. These and other changes and modifications that are obvious to those skilled in the art are intended to be included within the scope of the invention.

What is claimed is:

1. In a communications systems having a plurality of semi-autonomous communications nodes (SACNs) and a conflict resolution center, a method for managing resource allocation conflicts, said method comprising the steps of:
    a) sending, by a SACN, resource allocation data to said conflict resolution center;
    b) processing, by said conflict resolution center, said resource allocation data received from said SACN to determine when resource allocation conflicts exist; and
    c) when a resource allocation conflict exists, determining if said resource allocation is a routing problem; and using a rerouting algorithm to obtain new allocation data.

2. The method as claimed in claim 1, wherein said method further comprises the steps of:
    d) sending said new allocation data to said SACN.

3. The method as claimed in claim 2, wherein said method further comprises the steps of:
    e) receiving said new allocation data at said SACN;
    f) re-allocating, by said SACN, at least one resource using said new allocation data;
    g) informing at least one other SACN when said at least one resource has been re-allocated; and
    h) updating a first list of available resources.

4. The method as claimed in claim 1, wherein step a) further comprises the steps of:
    a1) allocating, by said SACN, a first resource using a first list of available resources, wherein said first list is established using a first local neighborhood data; and
    a2) sending said resource allocation data identifying said first resource.

5. The method as claimed in claim 1, wherein step b) further comprises the steps of:
    b1) processing said resource allocation data received from said SACN to determine a first allocated resource; and
    b2) comparing said first allocated resource to a list of allocated resources to determine if a conflict exists, said conflict existing when said list of allocated resources comprises said first allocated resource.

6. The method as claimed in claim 1, wherein step c) further comprises the step of:
    c1) using a historical database to resolve at least one resource allocation conflict.

7. The method as claimed in claim 1, wherein step c) further comprises the steps of:
    c1) determining if said resource allocation conflict is a frequency allocation problem;
    c2) using a frequency allocation algorithm to obtain said new allocation data, when said resource allocation conflict is said frequency allocation problem; and
    c3) refraining from using said frequency allocation algorithm, when said resource allocation conflict is not said frequency allocation problem.

8. The method as claimed in claim 1, wherein step c) further comprises the steps of:
    c1) determining if said resource allocation conflict is a local neighborhood problem;
    c2) using a local neighborhood algorithm to obtain said new allocation data, when said resource allocation conflict is said local neighborhood problem; and
    c3) refraining from using said local neighborhood algorithm, when said resource allocation conflict is not said local neighborhood problem.

9. In a communications system having a plurality of semi-autonomous communications nodes (SACNs) and a conflict resolution center, a method for managing resource allocation conflicts, said method comprising the steps of:
    a) sending, by SACN, resource allocation data to said conflict resolution center;
    b) processing by said conflict resolution center, said resource allocation data received from said SACN to determine when resource allocation conflicts exist; and
    c) when a resource allocation conflict exists, determining if said resource allocation conflict is a local processing problem; using ground-based resources, when said resource allocation conflict is a local processing problem; and refraining from using ground-based resources, when said resource allocation conflict is not said local processing problem.

10. The method as claimed in claim 1, wherein step c) further comprises the steps of:
    c1) determining when said resource allocation conflict cannot be resolved; and
    c2) notifying a system administrator, when said resource allocation conflict cannot be resolved.

11. The method as claimed in claim 1, wherein said method further comprises the step of:
    d) storing conflict resolution data for said SACN.

12. The method as claimed in claim 1, wherein said method further comprises the step of:
    establishing a historical database comprising data relating to allocation of resources and conflict resolution instructions.

13. In a communications system having a plurality of semi-autonomous communications nodes (SACNs), a conflict resolution center for managing said plurality of SACNs, said conflict resolution center comprising:
    at least one transceiver for receiving allocation data from at least one of said plurality of SACNs and for sending new allocation data to said at least one of said plurality of SACNs;
    a controller coupled to said at least one transceiver, said controller obtaining resource allocation information, determining a resource allocation conflict, using a re-routing algorithm to obtain new allocation data when said resource allocation conflict is a routing problem, and using ground-based resources when said resource allocation conflict is a local processing problem.

14. The communications system as claimed in claim 13, wherein said conflict resolution center further comprises:
    memory for storing resource allocation data and conflict resolution data for said plurality of SACNs.

15. The communications system as claimed in claim 13, wherein said conflict resolution center further comprises:
at least one interface for reporting conflict data for said plurality of SACNs to at least one system administrator.

16. The communications system as claimed in claim 13, wherein said conflict resolution center further comprises:
a memory for storing a historical database comprising data and conflict resolution instructions for said plurality of SACNs.

* * * * *